United States Patent Office 2,857,713
Patented Oct. 28, 1958

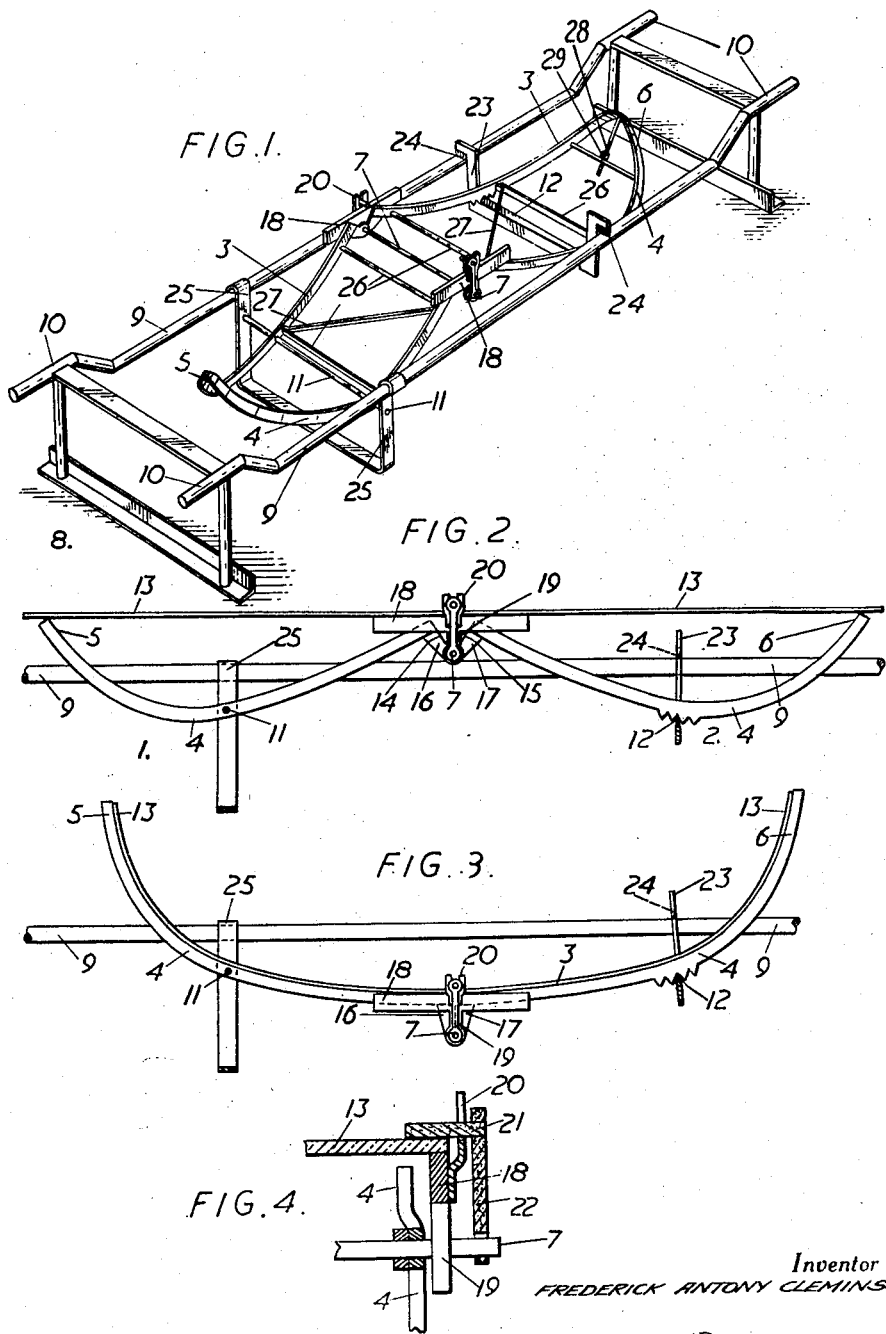

2,857,713

APPARATUS FOR USE IN BENDING FLAT GLASS

Frederick Antony Cleminson, London, England, assignor to Pilkington Brothers Limited, Liverpool, England, a corporation of Great Britain Application August 29, 1956, Serial No. 606,880

Claims priority, application Great Britain September 1, 1955

7 Claims. (Cl. 49—67)

This invention relates to apparatus for use in bending flat glass and has for its main object to devise an improved form of bending apparatus by which a desired bend in flat glass is precisely achieved, said apparatus being so constructed as to give central support to the glass during the initial stages of bending whereby a greater degree of bending is readily achieved towards the end of the glass and to minimise sliding movement of the glass during bending.

Apparatus according to the invention for use in producing a predetermined bend in flat glass by sagging under a heat treatment is constituted by two similar shaping elements, having a conjoint configuration to which the glass will conform at the end of a bending operation, hinged together so that one is a continuation of the other in the longitudinal direction of the apparatus, each of the two shaping elements being individually supported on a fulcrum member so that each shaping element is substantially balanced about its fulcrum when the frame is open, at least one of the fulcra being movable longitudinally of the chassis during a bending operation, the shaping elements being provided with abutments which hold the shaping elements as a continuous support for the glass at the end of a bending operation.

The shaping elements incorporated in the apparatus constructed according to the invention may be in the form of curved beds to give support to the whole of the glass at the end of the bending operation. Alternatively, as hereinafter more particularly described, the shaping elements may be constituted by sub-frames which when conjoined in the medial plane of the apparatus form a bending frame giving continuous peripheral support to the glass at the end of a bending operation.

Apparatus according to the invention may be constituted by two similar sub-frames each including a pair of similar side limbs connected at their outer ends, the sub-frames being hinged together at the free ends of the side limbs to constitute the shaping frame, a chassis for the shaping frame, each sub-frame being supported on a respective fulcrum member carried by the chassis, each sub-frame being substantially balanced about its fulcrum, at least one of the fulcra being movable longitudinally of the chassis during a bending operation, and the configuration of the limbs being such that they provide the frame with a continuous peripheral support for the glass with which the glass conforms as it approaches the fully bent condition, said limbs carrying abutments to predetermine the maximum opening of the frame.

Bending apparatus constructed according to the invention may comprise associated means operatively connected to the hinge joint between the shaping elements, said means being adapted to engage the middle area of the marginal portions of the flat glass, whereby the middle area of the glass and the hinge joint of the frame move down in unison during bending.

Such apparatus preferably comprises marginal supports for the middle area of the glass being bent, said supports being carried on the medial hinge member of the frame whereby the weight of the middle area of the glass is taken by the hinge joint during the bending operation.

The apparatus may be provided with finger elements disposed to engage over the marginal areas of the glass being bent, said fingers each emanating from an arm mounted on the medial hinge member of the frame whereby the inner ends of the frame are restrained against a quicker downward displacement than that attained by the middle area of the glass.

Preferably each fulcrum which is movable longitudinally of the chassis is in the form of knife edges connected by a bar passing transversely of the respective shaping element and operatively connected thereto and mounted on arms depending from further knife edges resting on the chassis whereby the shaping element can swing about the further knife edges longitudinally of the chassis.

Preferably the contiguous ends of the shaping elements are similarly cranked, the medial hinge member passing through the contiguous cranked portions, the latter carrying the said abutments, each end of the said hinge member carrying an arm which is not longer (and preferably is slightly shorter) than the cranked portions, on which arm is mounted a marginal support for the middle area of the flat glass, whereby the middle area of the glass is in engagement with the support until approaching the end of a bending operation at which time the support is retracted to an extent to be at least flush with the continuous profile of the shaping elements; thus the weight of the central portion of a glass sheet set on the shaping elements is taken on the marginal supports carrried by the medial hinge member.

Bending apparatus constructed according to the invention may include a fork construction mounted on one or both ends of the medial hinge member, each fork being settable about the axis member perpendicularly to the plane of the flat glass, in conjunction with a finger adapted to seat on the longitudinal edge of the flat glass in the middle area thereof, located in the respective fork and pivotally mounted on the medial hinge joint, so that the finger bears on the glass immediately above the said hinge joint; thus the medial hinge joint of the shaping members is suspended from the glass.

From the foregoing it will be observed that when using apparatus according to the invention the glass being bent is initially, and during a bending operation, supported at the ends by the outer ends of the shaping members and in the middle area by the marginal supports carried by the medial hinge member thus the rate of vertical displacement of the central area of the glass during sagging is controlled.

In order that the invention may be more clearly understood a preferred embodiment thereof, in a bending frame, will now be described by way of example with reference to the accompanying diagrammatic drawings in which:

Figure 1 is a perspective view showing a bending frame constructed according to the invention supported on a chassis by which it can be carried into the furnace in which the heat treatment resulting in bending the glass can be carried out;

Figures 2 and 3 are side elevations in which Figure 2 shows the frame parts at the beginning of a bending operation and Figure 3 shows the frame parts at the end of the operation; and Figure 4 is a detail view showing in side elevation the mounting of central fingers which bear on the glass during the whole operation.

In the drawings like references indicate the same parts.

Referring to the drawings, the shaping frame for use in bending flat glass by sagging comprises two exactly similar shaping elements constituted by sub-frames 1, 2 (see Figure 2), each comprising a pair of similar side limbs 3, 4 connected at the outer ends by merging parts 5, 6. These sub-frames are hinged together as indicated at 7 (hereinafter sometimes referred to as the medial hinge member), that is to say, at the free ends of the side limbs 3, 4, to constitute the shaping frame, the medial hinge member 7 of the shaping frame being below the free ends of the limbs.

The shaping frame is mounted on a chassis generally indicated at 8 (see Figure 1) and comprises longitudinals 8, 9 terminating in handles 10 for manipulating the chassis.

Each sub-frame 1, 2 is supported on a fulcrum carried by the chassis. The sub-frame 1 is provided with a fulcrum rod 11 and the sub-frame 2 with a fulcrum 12. Thus a downwardly directed effort applied to the hinge member 7 will cause the sub-frames to rock about their respective fulcra so that the outer ends 5, 6 simultaneously rise.

The configuration of the limbs is of course determined by the form of the bend desired to be given to the flat glass indicated at 13 in Figures 2, 3 and at the end of a bending operating provide the shaping frame with a continuous peripheral support for the glass 13.

As clearly shown in the drawing the limbs 3, 4 have a pronounced curve between the fulcra 11, 12 and the respective outer ends 5, 6 and a slight curvature between the fulcra and the hinge joint except for terminal cranked portions hereinafter referred to.

Experiments have shown that when the sub-frames 2, 3, are in the open position shown in Figure 2, each of the fulcra 11, 12 should be placed a little farther horizontally from the hinge member 7 than is the centre of gravity of each sub-frame 1, 2 in order to attain the aforesaid substantial balance of the shaping frame.

To arrest the rocking of the sub-frames about their pivots at the time when they present a continuous peripheral support for the glass, abutment faces 14, 15 are formed on cranked ends 16, 17 of the side limbs, through which ends the medial hinge joint on the hinge member 7 is made, thereby a firm continuous support is obtained for the glass at the end of the bending operation.

In order that the middle area of the glass and the frame shall move down in unison during the bending operation, a linear marginal support on the frame for the glass in its middle area is provided and to this end a T-shaped member is mounted at each side of the frame on the medial hinge member 7.

Each T-shaped member includes a horizontal bar 18 integral with a short vertical arm 19 and the hinge pin 7 passes through the lower ends of short arms 19. Thus when the glass 13 is first set on the frame it is carried on the bars 18 and the outer ends 5, 6 of the sub-frames.

While the rising temperature is gradually softening the flat glass and the bending of the glass is proceeding, the weight of the central part of the glass increasingly rests upon the bars 18. This contact of the centre of the glass with the bars 18 tends to hold the glass symmetrically on the frame during the bending; and the increasing proportion of the weight of the central part of the glass thus applied through the medial hinge member 7 to the adjacent inner ends of the two sub-frames causes the outer ends of the sub-frames to rise and assist the bending by raising the outer ends of the glass.

In order further to secure the glass against longitudinal movement, i. e. relatively to the frame, fingers may be fitted on the frame to cooperate with the bars 18. To this end each bar may be provided with an uprising fork 20 to straddle a finger 21 extending from a stem 22 in the lower end of which there is an eye to allow the stem to have a loose fit on one end of the hinge member 7 when the finger passes between the two prongs of its respective fork 20. Thereby the glass is held on the bar 18 during the major part of the bending operation.

The short arm 19 on which the bar 18 is carried is shorter than the cranked ends 14, 15 of the side limbs 3, 4, so that as the final bent position is approached the side limbs take over the support of the glass in its middle area from the bars 18, thus leaving the fully bent glass resting on the continuous profile of the shaping frame.

It will be readily appreciated that in order to assure the downward movement of the frame and of the glass in unison during bending, the fingers alone may be used, in which case the rigidity of the glass set on the frame is utilised to hold the middle part of the glass vertically above the hinge joint of the shaping frame and to maintain this relationship as the glass softens. The fingers 21 may be integral with their respective stems 22.

In order to avoid a distortion of the bend intended to be given to the glass during bending as a result of thermal expansion of the frame at least one of the fulcra of the sub-frame is movable longitudinally of the chassis. To this end one sub-frame, for example sub-frame 2, is supported on a swinging stirrup 23 slung on knife edges 24 resting on the longitudinals 9, 9 of the chassis. The swinging stirrup may also include a knife edge transversely of the chassis to constitute a substantially frictionless pivot 12. Clearly the transverse member of the stirrup 23 could pass through the limbs 3, 4 of the sub-frame 2 as does the fulcrum rod 11 of the sub-frame 1 which is carried on a more rigid stirrup indicated at 25 slung from the longitudinals of the chassis. If desired the stirrup 25 could be provided with knife edges such as 24 which rest on the longitudinals instead of hooking over the latter.

The sub-frames may be reinforced by transverse and diagonal braces indicated at 26 and 27 respectively and as shown in Figure 1 the sub-frame 2 may be provided with a threaded spindle 28 on which a weight 29 may be threaded to accurately adjust the balance on the respective sub-frame by axial displacement on the spindle. A similar arrangement for placing a bias on the sub-frame 1 may be provided.

In some desired shapes, the ends 5, 6 converge to a point which does not lie on the longitudinal centre line of the glass, which therefore tends when flat to tilt away from the horizontal in a transverse direction. In such case the support 18 on the side which tends to rise may be replaced entirely by a finger 21 which bears centrally on the top of the glass. To allow the bent glass to be lifted the finger may be readily removed by sliding stem 22 from the hinge member 7.

Apparatus constructed according to the present invention produces precise bends in flat glass as prescribed by the configuration of the shaping frame so that pairs of matching glasses can be produced bent ready for use in making laminated glass. The apparatus is, however, eminently suitable also for use in bending and toughening processes which require that the hot freshly bent glass shall be quickly subjected on both faces simultaneously to quenching jets of a chilling fluid.

By the present invention shaping apparatus for producing a desired bend in flat glass is provided which gives central supports to the glass during the initial stages of bending whereby a greater degree of bending is readily achieved towards the ends of the glass and which minimises relative sliding movement between the apparatus and the glass during bending.

I claim:

1. Apparatus for bending flat glass by sagging under a heat treatment characterised by a pair of shaping elements for the glass to be bent, a supporting chassis for the elements, said elements being individually fulcrumed on said chassis and each substantially in balance about the respective fulcrum, the elements being mounted so that one is a continuation of the other, a medial hinge joint connecting together the juxtaposed, inner ends, of the elements, at least one of the fulcra being free to swing longitudinally of the chassis, with the respective element, as the outer ends of the shaping elements rock upwardly towards one another during a bending operation, abutments carried by the inner ends of the elements, said abutments being disposed to oppose each other and arrest the rocking movement at the end of a bending operation, and regulating means for the elements mounted on the hinged joint between them, operatively associated with the marginal area of the glass overlying the medial hinge joint, said regulating means controlling the downward rocking movement of the inner ends of the elements as the glass is being bent, the inner ends of the elements being thereby maintained in their pristine association with the glass during a bending operation.

2. Apparatus for bending flat glass by sagging under a heat treatment characterised by a pair of U-shaped shaping frames for the glass to be bent, each including a pair of similar side limbs rigidly connected at their outer ends, a medial hinge joint connecting together the inner ends of the similar side limbs, a supporting chassis for the shaping frame, each shaping frame being individually fulcrumed on the chassis and substantially in balance about the respective fulcrum, at least one of the fulcra being free to swing longitudinally of the chassis, with the respective shaping frame, as the outer ends of the shaping frames rock upwardly towards one another during a bending operation, abutments carried by the inner ends of said side limbs, said abutments being disposed to oppose each other and arrest the rocking movement at the end of the bending operation, and regulating means for the shaping frames, mounted on the hinge joint connecting the side limbs, operatively associated with the marginal area of the glass overlying the medial hinge joint, said regulating means controlling the downward rocking movement of the inner ends of the limbs as the glass is being bent, said inner ends being thereby maintained in pristine association with the glass during the bending operation.

3. Apparatus for bending flat glass by sagging under a heat treatment characterised by a pair of shaping elements for the glass to be bent, a supporting chassis for the elements, said elements being individually fulcrumed on said chassis and each substantially in balance about the respective fulcrum, the elements being mounted so that one is a continuation of the other, a medial hinge joint connecting together the juxtaposed, inner ends, of the elements, at least one of the fulcra being free to swing longitudinally of the chassis, with the respective element, as the outer ends of the shaping elements rock upwardly towards one another during a bending operation, abutments carried by the inner ends of the elements, said abutments being disposed to oppose each other and arrest the rocking movement at the end of a bending operation, a marginal support for the medial area of each overlying edge of the glass being bent, each marginal support being carried on a stem mounted coaxially with the medial hinge joint so that the weight of the glass is at all times taken by the medial joint.

4. Apparatus for bending flat glass by sagging under a heat treatment characterised by a pair of shaping elements for the glass to bent, a supporting chassis for the elements, said elements being individually fulcrumed on said chassis and each substantially in balance about the respective fulcrum, the elements being mounted so that one is a continuation of the other, a medial hinge joint connecting together the juxtaposed, inner ends, of the elements, at least one of the fulcra being free to swing longitudinally of the chassis, with the respective element, as the outer ends of the shaping elements rock upwardly towards one another during a bending operation, abutments carried by the inner ends of the elements, said abutments being disposed to oppose each other and arrest the rocking movement, at the end of a bending operation, a finger overlapping the medial marginal area of the glass, an arm mounted coaxially with the medial hinge joint and carrying said finger, and a marginal support for the medial area of each overlying edge of the glass being bent, each marginal support being carried on a stem also mounted coaxially with the medial joint so that the inner ends of the shaping elements are maintained in pristine relation with the glass during a bending operation.

5. Apparatus for bending flat glass according to claim 1 characterised in that each fulcrum which can swing longitudinally of the chassis is in the form of knife edges connected by a bar passing transversely of the respective shaping element and operatively connected thereto and mounted on arms depending from further knife edges resting on the chassis.

6. Apparatus for bending flat glass according to claim 1 wherein the contiguous ends of the shaping elements are similarly cranked, the medial hinge member passing through the contiguous cranked portions, the latter carrying the said abutments, each end of the said hinge member also carrying an arm which is not longer (and preferably slightly shorter) than the cranked portions, on which arm is mounted a marginal support to engage the under side of the middle area of the flat glass, whereby the middle area of the glass is in engagement with the support until approaching the end of a bending operation at which time the support is retracted to an extent to be at least flush with the continuous profile of the shaping elements.

7. Apparatus for bending flat glass according to claim 1 wherein an adjustable fork construction is mounted on each end of the medial hinge member, each fork being settable about the hinge axis perpendicularly to the plane of the flat glass, in conjunction with the finger adapted to seat on the longitudinal edge of the flat glass in the middle area thereof, located in the respective fork and pivotally mounted on the medial hinge member, so that the finger bears on the glass immediately above the medial hinge member.

References Cited in the file of this patent

UNITED STATES PATENTS

| 760,959 | Connington | May 24, 1904 |
| 833,436 | Borland et al. | Oct. 16, 1906 |
| 2,551,606 | Jendrisak | May 8, 1951 |
| 2,746,209 | Walters | May 22, 1956 |

FOREIGN PATENTS

| 1,074,107 | France | Mar. 31, 1954 |
| 1,097,088 | France | Feb. 9, 1955 |
| 745,992 | Great Britain | Mar. 7, 1956 |